2,905,668
PHENTHIAZINE DERIVATIVES

Robert Michel Jacob, Ablon-sur-Seine, and Raymond Jacques Horclois, Malakoff, France, assignors to Societe des Usines Chimiques Rhone-Poulenc, Paris, France, a French body corporate No Drawing. Application January 27, 1958
Serial No. 711,150
Claims priority, application France February 7, 1957

7 Claims. (Cl. 260—243)

This invention relates to new derivatives of phenthiazine and to processes for their preparation.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion sickness. It has nevertheless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide new phenthiazine derivatives which possess unexpectedly useful pharmacological properties. It is a further object of the invention to provide processes for the production of these new compounds.

The phenthiazine derivatives of the present invention are those which conform to the general formula:

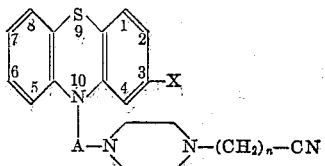

I and their acid addition salts and quaternary ammonium derivatives, wherein A represents a straight or branched chain, divalent saturated aliphatic hydrocarbon group containing 2 to 4 carbon atoms, X represents a hydrogen or halogen atom or a lower alkyl, alkoxy, acyl or alkoxycarbonyl group or a cyano, methylthio, methanesulphonyl or dimethylsulphamoyl group, and $n$ represents 1 or 2. The qualification "lower" as applied to alkyl, alkoxy, acyl and alkoxycarbonyl groups means that the group in question contains not more than four carbon atoms.

The new phenthiazine compounds of the present invention may be prepared by the application of known methods for the production of 10-aminoalkyl-phenthiazines. By the words "known methods" as used in this specification is meant methods heretofore employed or described in the chemical literature.

The majority of methods so applied can be described generically as consisting in reacting a phenthiazine derivative of the general formula:

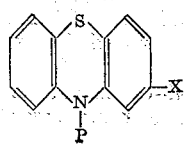

II with a compound Q, the group P and the compound Q being such that Q will react with the phenthiazine derivative so as to introduce or form in the 10-position of the ring a substituent grouping of the structure:

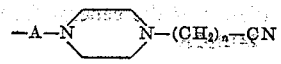

III wherein X, A and $n$ are as hereinbefore defined.

Preferred processes of manufacture are as follows:

(1) Interaction of a phenthiazine derivative of the general formula:

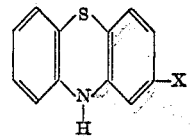

IV (wherein X is as hereinbefore defined) with a piperazine derivative of the general formula:

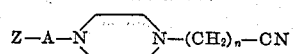

V (wherein Z represents the acid residue of a reactive ester, such as a halogen atom or a sulphonic or sulphuric ester residue, and the other symbols are as hereinbefore defined).

(2) Interaction of a phenthiazine derivative of the general formula:

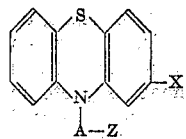

VI with a piperazine derivative of the general formula:

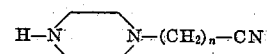

VII the various symbols being as hereinbefore defined.

(3) Interaction of a phenthiazine derivative of the general formula:

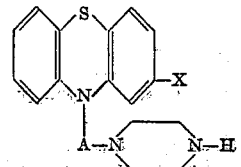

VIII with a reactive ester of the general formula:

$$Z—(CH_2)_n—CN$$

IX or, when $n$ is 2, with acrylonitrile, the various symbols being as hereinbefore defined.

(4) Interaction of a phenthiazine derivative of general formula:

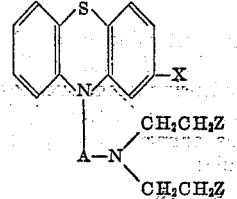

X with an amine of general formula:

$$H_2N—(CH_2)_n—CN$$

XI the various symbols being as hereinbefore defined.

(5) Interaction of a phenthiazine derivative of the general formula:

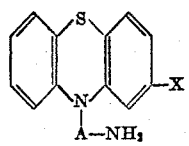

with a reactive diester of the general formula:

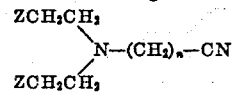

the various symbols being as hereinbefore defined.

(6) The action of a reactive phenthiazine ester of the general formula:

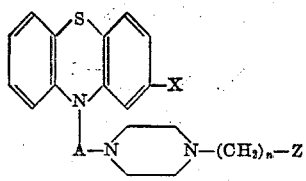

upon a salt of hydrocyanic acid, in particular a cyanide of an alkali metal, the various symbols being as hereinbefore defined.

In a modification when Z represents a halogen atom, the corresponding magnesium derivative can be prepared and reacted with cyanogen or cyanogen chloride.

The foregoing processes may be carried out with or without a solvent in the presence or absence of a condensing agent. It is generally advantageous to operate in an inert organic solvent medium such as an aromatic hydrocarbon (preferably benzene, toluene or xylene), an ether (for example, diethyl ether) or an amide (for example, dimethylformamide). The use of a condensing agent is often advantageous, preferably in the form of an alkali metal or a derivative thereof such as hydroxide, hydride, amide or alcoholate.

The reactions are carried out at room temperature or at an elevated temperature according to the nature of the reactants and to the presence or absence of solvent and condensing agent.

(7) Decomposition of a phenthiazine-10-carboxylate of the general formula:

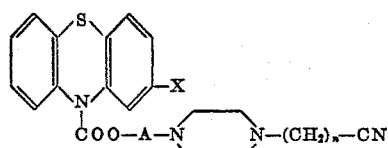

(wherein the various symbols are as hereinbefore defined) by heating the carboxylate, preferably to a temperature above 100° C., for example between 150 and 220° C., until evolution of carbon dioxide ceases.

The reaction can be effected with the phenthiazine-10-carboxylate alone, i.e. without a diluent, or in an inert medium of high boiling point such as diphenyl or diphenyl oxide, a chlorinated aromatic hydrocarbon, e.g. o-dichlorobenzene, or in a classical diluent for decarboxylation such, for example, as quinoline or a weak base.

(8) Cyclisation, preferably in a solvent in the form of a substituted amide of a lower aliphatic acid in the presence of a condensing agent such as an alkali metal hydroxide or carbonate and optionally in the presence of a catalyst such as copper powder, of a compound of the general formula:

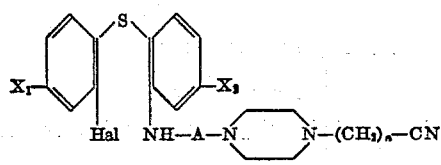

(wherein one of $X_1$ and $X_2$ represents a hydrogen atom and the other the group X, Hal represents a halogen atom, preferably chlorine or bromine, and the other symbols are as hereinbefore defined).

(9) Cyclisation, by heating in the presence of sulphur or one of its derivatives and optionally with a catalyst such as iodine, of a diphenylamine of general formula:

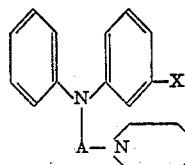

where the various symbols are as hereinbefore defined.

The phenthiazine derivatives of the present invention possess interesting pharmacodynamic properties; in particular, they are very active as sedatives, antiemetics and cataleptics. Their sedative activity (which is particularly important) may be illustrated by classical tests such as potentiation of narcosis (hypnotics and analgesics), conditioned reflex (traction test) and that of Winter and Flataker. Outstandingly active compounds are those in which A represents the chain —$(CH_2)_3$— and $n$ is equal to 2. Among compounds of this type there may be mentioned in particular those in which X represents the groups cyano, methylthio, methyl and acetyl or alternatively a chlorine atom; of especial importance is the compound in which X represents a cyano group.

For therapeutic purposes, the bases of general formula I may be employed in the form of acid addition salts containing anions which are relatively innocuous to the animal organism in therapeutic doses of the salts (such as hydrochlorides and other hydrohalides, phosphates, nitrates, sulphates, maleates, fumarates, citrates, tartrates, oxalates, methanesulphonates and ethanedisulphonates) so that the beneficial physiological properties inherent in the bases are not vitiated by side-effects ascribable to the anions. However, they may also be similarly employed in the form of quaternary ammonium salts obtained by reaction with organic halides (e.g. methyl or ethyl iodide, chloride or bromide or allyl or benzyl chloride or bromide) or other reactive esters, e.g. toluene-p-sulphonates.

The following examples, in which the melting points indicated were determined on the Kofler bench, illustrate the invention.

Example 1

An 18% solution (12 cc.) of potassium ethylate in ethanol is added to a solution of phenthiazine (4.4 g) in dimethylformamide (40 cc.), and the ethanol is distilled under ordinary pressure until the boiling point of pure dimethylformamide is reached. To the hot liquor is added a solution of 1(3-chloropropyl)-4-cyanomethyl piperazine (5.05 g.) in dimethylformamide (10 cc.) and the mixture is then heated for 17 hours under reflux. After cooling, the mass is diluted with water (100 cc.) and extracted with chloroform (3 x 50 cc.) and the combined chloroformic solutions are washed with water (3 x 50 cc.). The chloroformic phase is extracted with 10% hydrochloric acid (50 cc.) and water (2 x 25 cc.). After treatment of the aqueous acid solutions with sodium hydroxide ($d=1.33$, 30 cc.), the free base is extracted with chloroform. On elimination of the solvent there is obtained an impure base (7 g.) which is dissolved in a 1:1 mixture of benzene and cyclohexane (200 cc.), and filtered over chromatographic alumina (100 g.). After elution with mixtures of benzene and cyclohexane and then of benzene and ethyl acetate and recrystallisation from cyclohexane of the fractions isolated, there is obtained pure 1-[3-(10-phenthiazinyl)propyl]-4-cyanomethylpiperazine as a white crystalline powder, M.P. 126° C.

The 1-(3-chloropropyl)-4-cyanomethylpiperazine starting material, whose dihydrochloride melts at 186° C. is obtained by the action of thionyl chloride upon a suspension in chloroform of 1-(3-hydroxypropyl)-4-cyanomethylpiperazine dihydrochloride. The required 1-(3-hydroxypropyl)-4-cyanomethylpiperazine (B.P. 145–147° C./0.5 mm. Hg) is prepared by the action of chloroacetonitrile upon a boiling solution of hydroxypropylpiperazine in 95% ethanol in the presence of sodium bicarbonate.

*Example II*

Proceeding as in the preceding example but commencing with phenthiazine (4.6 g.) and 1-(3-chloropropyl)-4-(2-cyanoethyl)piperazine (5.8 g.) there is obtained 1-[3-(10-phenthiazinyl)propyl]-4-(2-cyanoethyl)piperazine as a yellow oil, the dimaleate (3.8 g.) of which prepared in ethanol is a white crystalline powder melting at 154° C.

The 1-(3-chloropropyl)-4-(2-cyanoethyl)piperazine starting material, whose dihydrochloride melts at 214° C., is obtained by the action of thionyl chloride upon a suspension in chloroform of 1-(3-hydroxypropyl)-4-(2-cyanoethyl)piperazine dihydrochloride. The required 1-(3-hydroxypropyl)-4-(2-cyanoethyl)piperazine (B.P.=145–147° C./0.3 mm. Hg) is prepared by the action of acrylonitrile at 5° C. upon an ethanol solution of hydroxypropylpiperazine in the presence of a small quantity of a 40% aqueous solution of Triton B.

*Example III*

1-[3-(3-chloro-10-phenthiazinyl)propyl]piperazine (7.2 g.) is mixed with triethylamine (2.2 g.) and ethanol (10 cc.) with agitation and a solution of chloroacetonitrile (1.5 g.) in ethanol (2 cc.) is run in at 6° C. The mixture is left to stand for ½ hour and is then heated on the water-bath for 2 hours under reflux. It is then concentrated in vacuo on the water-bath, N sodium hydroxide (25 cc.) is added and the oil is extracted with ether (3 x 20 cc.). The ethereal layer is washed with water (2 x 15 cc.) and agitated with N hydrochloric acid (50 cc.). The aqueous acid layer is decanted and the base is liberated with sodium hydroxide (d=1.33, 10 cc.) and extracted with ether (3 x 25 cc.). The ethereal layer is dried over potassium carbonate and concentrated. A crude base (7 g.) is obtained which is recrystallised from ethanol (50 cc.). 1-[3-(3-chloro-10-phenthiazinyl)propyl]-4-cyanomethylpiperazine (5.5 g.) is isolated, M.P. 96° C.

*Example IV*

1-[3-(3-chloro-10-phenthiazinyl)propyl]piperazine (7.2 g.) is mixed with acrylonitrile (10 cc.) with agitation. It is then cooled to —6° C. and two drops of a 40% aqueous solution Triton B are added. The mixture is left to stand for ½ hour and is then heated on the water-bath under reflux for 1½ hours. An oil is obtained which crystallises on scratching in cyclohexane. The product is filtered off and washed with cyclohexane and there is obtained 1-[3-(3-chloro-10-phenthiazinyl)-propyl]-4-(2-cyanoethyl)piperazine (7.2 g.), M.P. 100° C. after recrystallisation from ethanol.

*Example V*

1-[3-(3-chloro-10-phenthiazinyl)propyl]-4-(2-cyanoethyl)piperazine (4.1 g.) is heated with methyl iodide (50 cc.) on the water-bath for 6 hours under reflux. On concentration, the dimethiodide (7 g.) is obtained which melts at 245° C. on recrystallisation from 75% ethanol.

*Example VI*

A solution of 3-methyl-10-(3-toluene-p-sulphonyloxypropyl)phenthiazine (8.5 g.) and cyanomethylpiperazine (5 g.) in methylethyl ketone (100 cc.) is heated for 24 hours under reflux. The solvent is removed at ordinary pressure and water (50 cc.) is added to the residue which is then extracted with chloroform (50 cc. followed by 25 cc.). The chloroform phase is extracted with 10% hydrochloric acid (50 cc.) and water (50 cc.), the aqueous acid is made alkaline with sodium hydroxide (d=1.33, 20 cc.), the liberated base is extracted with ether and the ethereal solution is dried over anhydrous sodium sulphate and evaporated to dryness on the water-bath. The residual solid base is recrystallised from heptane. There is thus obtained 1-[3-(3-methyl-10-phenthiazinyl)propyl]-4-cyanomethyl piperazine (3.2 g.) as a white crystalline powder M.P. 107° C.

The initial cyanomethylpiperazine (B.P. 88–90° C./0.7 mm. Hg) is obtained by the action of the chloroacetonitrile (0.5 mol.) upon a boiling solution of anhydrous piperazine (1 mol.) in 95% ethanol in the presence of sodium bicarbonate (0.7 mol.).

*Example VII*

Proceeding as in the preceding example but commencing with 3-methyl-10-(3-toluene-p-sulphonyloxypropyl)-phenthiazine (8.5 g.) and 2-cyanoethylpiperazine (5.6 g.) there is obtained 1-[3-(3-methyl-10-phenthiazinyl)-propyl]-4-(2-cyanoethyl)piperazine as a pale yellow oil, the dimaleate (8.5 g.) of which prepared in ethanol is a yellow powder M.P. 180° C.

The initial cyanoethylpiperazine (B.P. 110–112° C./0.5 mm. Hg) is obtained by the action of acrylonitrile (0.5 mol.) at 5° C. upon an ethanolic solution of anhydrous piperazine (1 mol.) in the presence of thirty drops of a 40% aqueous solution of Triton B.

*Example VIII*

3-(4-cyanoethyl-1-piperazinyl)propyl 3-acetylphenthiazinyl-10-carboxylate (5 g.) is heated between 160–220° C. under a pressure of 2 mm. Hg until the evolution of carbon dioxide has ceased. The reaction mass is dissolved while still warm in chloroform (50 cc.) and the solution is extracted with 10% hydrochloric acid (20 and 10 cc.). After washing with chloroform (2 x 100 cc.), the aqueous acid phase is made alkaline with sodium hydroxide (d=1.33) and the liberated base is extracted with chloroform. After elimination of the solvent, an impure base (3 g.) is obtained which is dissolved in a 2:1 mixture (120 cc.) of benzene and cyclohexane and chromatographed over a column of alumina (100 g.). After the elimination of the secondary products by elution with the benzene and cyclohexane mixture, the pure base is readily isolated by elution with benzene followed by a mixture of benzene and ethyl acetate. After evaporation of the solvent, there is obtained 1-[3-(3-acetyl-10-phenthiazinyl)propyl]-4-(2-cyanoethyl)piperazine as a yellow oil, the dimaleate of which, prepared in ethanol, is a yellow crystalline powder, M.P. 154° C.

The 3-(4-cyanoethyl-1-piperazinyl)propyl 3-acetyl-phenthiazinyl-10-carboxylate, M.P. 126° C., is obtained by the condensation of 3-acetylphenthiazinyl-10-carbonyl chloride with 1-(3-hydroxypropyl)-4-(2-cyanoethyl)-piperazine in toluene for 7 hours under reflux.

*Example IX*

Triethylamine (1.1 g.) is added to a solution of 1-[3-(3-cyano-10-phenthiazinyl)propyl]piperazine (3.5 g.) in toluene (35 cc.). The mixture is cooled to 5° C. and a solution of chloracetonitrile (0.75 g.) in ethanol (10 cc.) is run in over 5 minutes. The mixture is allowed to warm up to 20° C. and is then heated under reflux for 4 hours. After cooling, it is washed with water and the basic products are extracted with 10% hydrochloric acid (40 cc.); the base is liberated with sodium hydroxide (d=1.33, 20 cc.) and is extracted with chloroform. The crude base is converted into the maleate in a mixture of ethanol and isopropanol. After recrystallisation from isopropanol, there is obtained 1-[3-(3-cyano-10-phenthiazinyl)propyl]-4-cyanomethylpiperazine monomaleate (3.3 g.) as a yellow crystalline powder, M.P. 188° C.

Example X

1-[3-(3-cyano-10-phenthiazinyl)propyl]piperazine (3.55 g.) is dissolved in toluene (35 cc.). The mixture is cooled to 5° C. and acrylonitrile (10 cc.) is added. After the addition of three drops of a 40% aqueous solution of Triton B the mixture is heated on a water-bath for 5 hours and then washed with water and with 10% hydrochloric acid (40 cc.). The base is liberated with sodium hydroxide and extracted with chloroform. The hydrochloride is prepared by the action of an ethereal solution of hydrogen chloride upon the base dissolved in ethanol. There is obtained 1-[3-(3-cyano-10-phenthiazinyl)propyl]-4-(2-cyanoethyl)piperazine dihydrochloride (4 g.), M.P. 222° C.

Example XI

To a suspension of 1-[3-(3-methylthio-10-phenthiazinyl)propyl]piperazine (3.7 g.) in acrylonitrile (5 cc.) and ethanol (10 cc.) at 13° C. are added four drops of a 40% aqueous solution of Triton B, and the mixture is then heated under reflux for 3 hours. After cooling, insoluble material is removed by filtration and the mother liquors are evaporated to dryness on the water-bath. The gummy residue is converted into the maleate in ethanol. After recrystallisation from isopropanol there is obtained 1-[3-(3-methylthio-10-phenthiazinyl)propyl]-4-(2-cyanoethyl)piperazine dimaleate (3.2 g.) as a creamy white crystalline powder, M.P. 160° C.

The initial 1-[3-(3-methylthio-10-phenthiazinyl)propyl]piperazine, whose maleate melts at 175° C., is obtained by the action of an excess of anhydrous piperazine upon 3-methylthio-10-(3-toluene-p-sulphonyloxypropyl)phenthiazine in the presence of methylethyl ketone for 20 hours under reflux.

We claim:

1. A member of the class consisting of a phenthiazine derivative of the general formula:

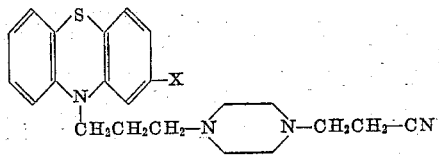

and its acid addition salts having pharmaceutically acceptable anions wherein X is selected from the class consisting of hydrogen and halogen atoms and lower alkyl, lower alkoxy, lower alkanoyl and lower alkoxy-carbonyl groups and cyano, methylthio, methanesulphonyl and dimethyl-sulphamoyl groups.

2. 1-[3-(10-phenthiazinyl)propyl]-4-(2-cyanoethyl) piperazine.

3. 1-[3-(3-chloro-10-phenthiazinyl)propyl]-4-(2-cyanoethyl)-piperazine.

4. 1-[3-(3-methyl-10-phenthiazinyl)propyl]-4-(2-cyanoethyl)piperazine.

5. 1-[3-(3-acetyl-10-phenthiazinyl)propyl]-4-(2-cyanoethyl)piperazine.

6. 1-[3-(3-cyano-10-phenthiazinyl)propyl]-4-(2-cyanoethyl)piperazine.

7. 1-[3-(3-methylthio-10-phenthiazinyl)propyl]-4-(2-cyanoethyl)-piperazine.

References Cited in the file of this patent

UNITED STATES PATENTS

| | | |
|---|---|---|
| 2,272,498 | Zerweck et al. | Feb. 10, 1942 |

FOREIGN PATENTS

| | | |
|---|---|---|
| 203,708 | Australia | Oct. 20, 1955 |